June 11, 1929.  A. J. DEXTER  1,716,578
BEAD SETTER
Filed Jan. 19, 1928
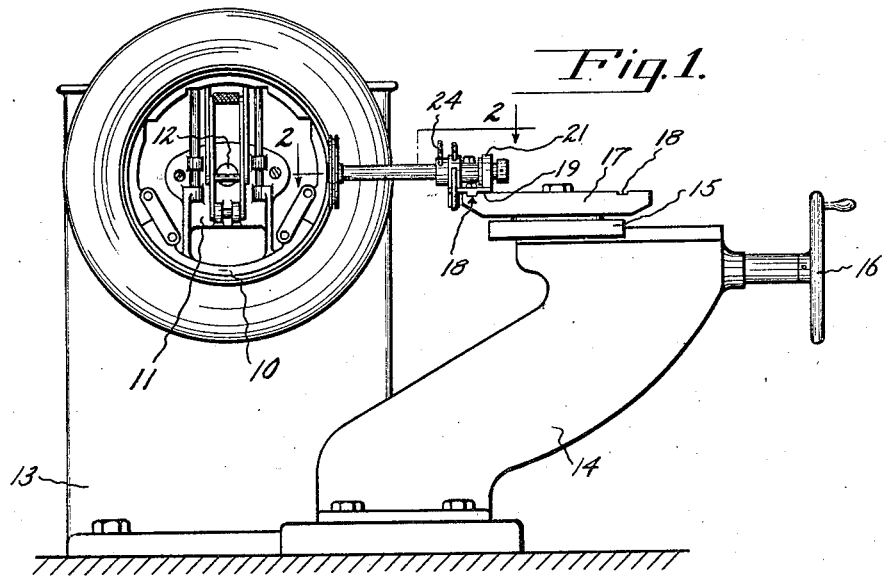
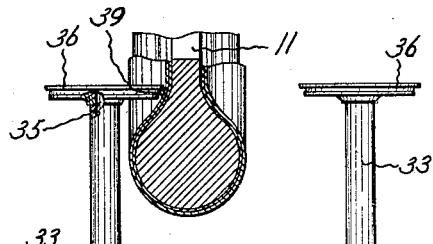
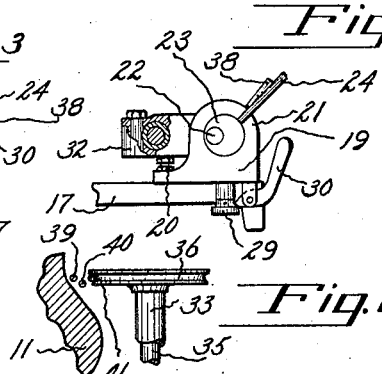
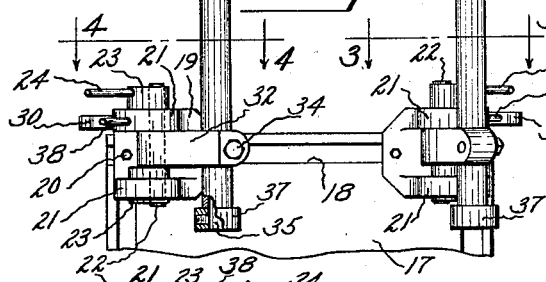
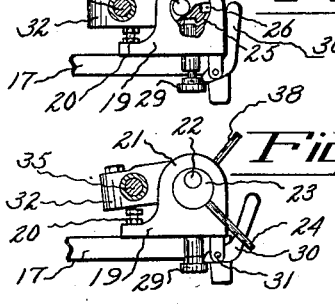
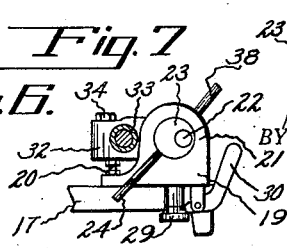

Patented June 11, 1929.

1,716,578

UNITED STATES PATENT OFFICE.

ALBERT J. DEXTER, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

BEAD SETTER.

Application filed January 19, 1928. Serial No. 247,871.

In the building of pneumatic tire casings on tire-shaped cores or formers it has been proposed to guide the bead anchoring wires into place against the partially laid carcass plies by grooved rollers. In larger tires several bead wires are used, successive wires being of different diameters and, of course, being spaced further apart by the thickness of the added carcass plies. My invention relates to a mounting for these rollers whereby they may be changed expeditiously from one predetermined position to another to accommodate the differing positions of these successive wires.

Referring to the drawings,

Fig. 1 is a side elevation of a machine embodying my invention, other features being generally omitted;

Fig. 2 is a detail plan on line 2—2 of Fig. 1 on a larger scale;

Fig. 3 is a section on line 3—3 of Fig. 2;

Fig. 4 is a section on line 4—4 of Fig. 2;

Figs. 5, 6, and 7 are details corresponding to Fig. 4 showing different positions in the use of the device;

Fig. 8 is a diagrammatic view showing the position of successive bead wires in the side of the casing; and Fig. 9 is a development of a cam.

The former 10 upon which the tire carcass is built is shown as carried upon a chuck 11 rotatable on a shaft 12 in a frame 13. A second frame 14 has at its top a slide 15, the position of which is determined by a handwheel 16 through suitable mechanism common in machines of this general type. A turntable 17 mounted upon this slide carries various mechanisms such as spinning rolls which are not shown, each of these mechanisms being secured in mounting grooves 18 in the turntable for successive presentation to the tire being built.

The bead setters forming the subject of the present invention are carried on slides 19 held to the turntable by screws 20 which also serve as stops as will appear later. Each slide has a pair of upright lugs 21 through which passes a shaft 22 having eccentric bearing portions 23. By means of a handle 24 secured to one of these portions the shaft can be rotated eccentrically into any one of the three positions shown in Figs. 5, 6, and 7 respectively. At the same time the shaft is moved axially by a cam groove 25 cut in one of the eccentric portions 23 and having positioning holes 26 for a pin 27. This pin, which is laterally fixed in the slide, is always in engagement with the cam groove, but is movable into the holes 26 under the influence of a spring 28 compressed between a shoulder on the end of the pin and a shoulder on the slide. A handle 29 permits the pin to be withdrawn from the holes when desired, permitting the shaft to be rotated. For convenience the handle may be operated by a lever 30 pivoted at 31 to the slide, in a manner evident from a comparison of Figs. 5 and 6.

An arm 32 is loosely mounted on each of the shafts 22 intermediate the eccentric portions, and receives a sleeve 33 held in place by a stud 34. A shaft 35 passes freely through the sleeve, bearing at one end a grooved bead setting roller 36 and at the other a collar 37 which prevents longitudinal movement. When in the active position shown at the left in Fig. 2 the arm 32 rests against the screw 20, while in the inactive position shown at the right (and in Fig. 3) the sleeve 33 rests against a stop pin 38.

The rollers are left in the inactive position until turntable 17 is rotated and the slide 15 advanced to bring them into adjacency to the former 10. At the left in Fig. 2, and again in Fig. 4, the parts have been shown in the position for placing the first bead wire 39. When this operation has been completed the bead setters are generally withdrawn by first swinging arms 32 to inactive position and then retracting the slide 15. As the rolls are positioned successively for the remaining bead wires the operating parts appear as in Figs. 6 and 7.

In the first of these the handle 24 assumes an intermediate position, in which the cam groove 25 is centralized with respect to the cam roll 26. In this condition of the parts two shifts have been made in the position of the rolls 36. First, the rolls are moved somewhat away from the side of the tire by reason of the eccentric mounting of shafts 22, being separated from the former 11 a distance sufficient to accommodate the plies of carcass material underlying the wire 40. Second, the shafts 22 are moved axially by the cams, causing the rolls 36 to be shifted slightly away from the axis of the former 11; this being apparent from the position of wire 40 in Fig. 8.

After the wires 40 have been applied additional plies of fabric are put in place, the bead setters being meanwhile retracted, and finally the bead setters are again positioned for the setting of wires 41. The handle 24 is for this operation swung to the position of Fig. 7, and again the effect is two-fold. First, the separation of the rolls from the side of the core is again increased, and, second, the axial position of shafts 22 is brought back to where it was in the condition shown in Fig. 5. Of course the shape of cam groove 25, and the eccentricity of mounting of shafts 22, may be varied to accommodate the machine to other designs of beads, but the principle of the invention will remain unchanged. For beads having more than three wires the position of the slides 19 in the grooves 18 may be varied, either through the medium of screws 20 or by any suitable adjusting mechanism, after the first group of beads have been applied as described above.

Having thus described my invention, I claim:

1. Bead setting apparatus comprising a pivoted arm, a shaft carried by the arm, a grooved bead setting roll mounted on the shaft, and an adjustment for said arm comprising a shaft upon which said arm is freely pivoted, an eccentric mounting for the shaft, and a cam operative to vary the axial position of the shaft as its eccentric position is changed.

2. Bead setting apparatus comprising a device engaging a bead and guiding it against a tire casing, and a mounting for said device having a plurality of adjusted positions, the adjustment of said mounting varying the position of the device simultaneously in two directions at right angles to each other.

3. Bead setting apparatus comprising a bead engaging roll adapted to position a bead adjacent the side of a tire, means for adjusting the position of the roll toward and away from the side of the tire, means for adjusting the position of the roll toward and away from the axis of the tire, and unitary control means causing simultaneous action of both adjusting means in predetermined relation.

ALBERT J. DEXTER.